| (12) | United States Patent | (10) Patent No.: | US 11,451,147 B2 |
|---|---|---|---|
| | Mori | (45) Date of Patent: | Sep. 20, 2022 |

(54) TRANSMISSION CIRCUIT FOR TRANSMITTING SIGNALS

(71) Applicant: ABLIC Inc., Chiba (JP)

(72) Inventor: Ryosuke Mori, Chiba (JP)

(73) Assignee: ABLIC Inc., Chiba (JP)

( * ) Notice: Subject to any disclaimer, the term of this patent is extended or adjusted under 35 U.S.C. 154(b) by 275 days.

(21) Appl. No.: 16/857,155

(22) Filed: Apr. 23, 2020

(65) Prior Publication Data

US 2020/0366201 A1 Nov. 19, 2020

(30) Foreign Application Priority Data

May 13, 2019 (JP) .............................. JP2019-090731

(51) Int. Cl.
*H02M 3/158* (2006.01)

(52) U.S. Cl.
CPC .................................. *H02M 3/158* (2013.01)

(58) Field of Classification Search
CPC .................................................... H02M 3/158
See application file for complete search history.

(56) References Cited

U.S. PATENT DOCUMENTS

| 10,075,068 | B2 * | 9/2018 | Utsunomiya | ......... H02J 7/0063 |
|---|---|---|---|---|
| 2018/0212472 | A1 * | 7/2018 | Okazaki | ............ H02M 3/33507 |
| 2018/0241253 | A1 * | 8/2018 | Hoshino | ................. H02J 50/12 |
| 2018/0254667 | A1 * | 9/2018 | Okazaki | ................. H02J 50/12 |
| 2020/0355178 | A1 * | 11/2020 | Okaguchi | ............... F04B 43/04 |

FOREIGN PATENT DOCUMENTS

JP 2007156997 6/2007

\* cited by examiner

*Primary Examiner* — Rafael O De Leon Domenech
(74) *Attorney, Agent, or Firm* — JCIPRNET

(57) ABSTRACT

A transmission circuit includes: a resistor with one end connected to a first power supply; an output terminal connected to the other end of the resistor; an inductor with one end connected to the output terminal; a switch with one end connected to the other end of the inductor and the other end connected to a second power supply; a diode in which an anode is connected to the other end of the inductor and one end of the switch and which is conductive when the switch is off and non-conductive when the switch is on; and a load with one end connected to a cathode of the diode and the other end connected to the second power supply.

15 Claims, 3 Drawing Sheets

TRANSMISSION CIRCUIT FOR TRANSMITTING SIGNALS

CROSS REFERENCE TO RELATED APPLICATIONS

This application claims the priority benefit of Japanese Patent Application No. 2019-090731, filed on May 13, 2019. The entirety of the above-mentioned patent application is hereby incorporated by reference herein and made a part of this specification.

BACKGROUND

Technical Field

The present invention relates to a transmission circuit.

Related Art

As a transmission circuit for transmitting detection information of a sensor that detects information such as magnetic field, temperature, pressure, and the like, a transmission circuit which does not include a signal line for outputting a detection signal by sharing the signal line with a ground line has been proposed (for example, see Japanese Patent Laid-Open No. 2007-156997).

However, when the technology described in Japanese Patent Laid-Open No. 2007-156997 is applied to an IC including a sensor (hereinafter, referred to as sensor IC), the potential of the ground (hereinafter, referred to as GND) remarkably fluctuates.

In the transmission circuit described in Japanese Patent Laid-Open No. 2007-156997, a resistor R is connected between the GND and a cathode of a stable power supply. In this transmission circuit, because the voltage corresponding to the voltage drop caused by the resistor R is supplied from the stable power supply to the GND of the sensor IC, the potential of the GND increases by the voltage drop caused by the resistor R. Accordingly, in the sensor IC to which this transmission circuit is applied, the potential of the GND which is essentially desired to be stable becomes unstable due to the influence of the current flowing through the resistor R. When an analog signal supplied from a linear type sensor is to be sent to a processor, not only a binary value but also a voltage corresponding to the analog signal becomes the GND potential of the sensor IC, and the fluctuation of the GND potential is remarkable.

In addition, in this transmission circuit, when the current output from the sensor is set to increase in order to detect physical quantity with high sensitivity, the current flowing through the resistor R increases, and thus a voltage difference between the power supply voltage applied to the sensor IC and the GND decreases. If the voltage difference between the power supply voltage applied to the sensor IC and the GND is lower than the lower limit of the operational voltage range of the sensor IC, the sensor IC malfunctions. That is, there is a trade-off relationship between the current output from the sensor and the voltage difference between the power supply voltage applied to the sensor IC and the GND, and it is difficult to achieve both the high sensitivity for detecting physical quantity and the stable operation of the sensor IC.

SUMMARY

In view of the above circumstances, the present invention provides a transmission circuit capable of stably operating a sensor IC even when the detection sensitivity of physical quantity of a physical quantity sensor is high.

The transmission circuit according to an embodiment of the present invention includes: a first resistor with one end connected to a first power supply; an output terminal connected to the other end of the first resistor; an inductor with one end connected to the output terminal; a first switch with one end connected to the other end of the inductor and the other end connected to a second power supply; a rectifying element in which one end is connected to the other end of the inductor and one end of the first switch, and which is conductive when the first switch is off and non-conductive when the first switch is on; and a load with one end connected to the other end of the rectifying element and the other end connected to the second power supply.

According to the transmission circuit, the sensor IC can be stably operated even when the detection sensitivity of physical quantity of the physical quantity sensor is high.

DESCRIPTION OF THE EMBODIMENTS

Hereinafter, a transmission circuit according to an embodiment of the present invention is described with reference to the drawings. The transmission circuit of the embodiment is a transmission circuit for transmitting signals supplied from a signal output circuit possessed by a load to a processor, and is a transmission circuit in which a signal line is shared with a power supply line.

Figure 1:
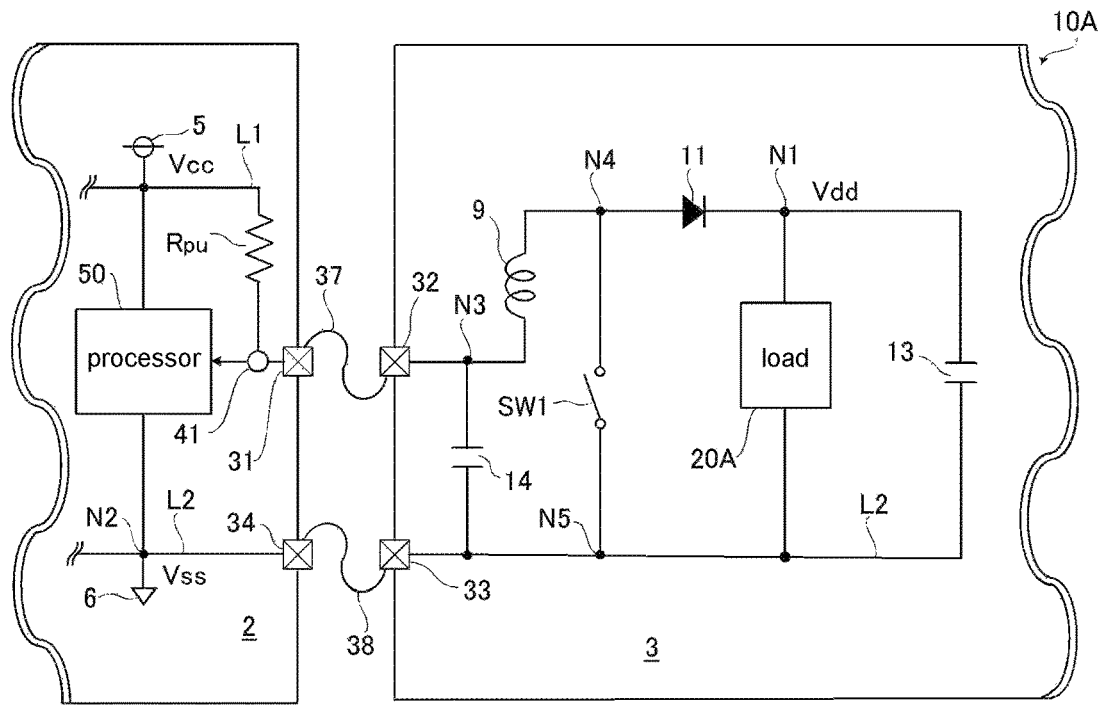
FIG. 1 is a circuit configuration diagram illustrating an example of a transmission circuit of an embodiment.

FIG. 1 is a circuit configuration diagram illustrating a transmission circuit 10A which is an example of the transmission circuit of the embodiment. The transmission circuit 10A includes, for example, a power supply terminal 5, a GND terminal 6, a resistor Rpu, an inductor 9, a switch SW1, a diode 11, capacitors 13 and 14, a load 20A, terminals 31-34, covered wires 37 and 38, an output terminal 41, and a processor 50. In addition, the transmission circuit 10A includes a main board 2 serving as a first substrate and a sub-board 3 serving as a second substrate. On the upper surface of the main board 2, the power supply terminal 5, the GND terminal 6, the resistor Rpu, the output terminal 41, the processor 50, and the terminals 31 and 34 are formed.

The power supply terminal 5 is connected to a first power supply (not shown) being a stable power supply and supplies a power supply voltage Vcc to a power supply line L1. One end of the resistor Rpu and one end of the processor 50 are connected to the power supply line L1. One end of the resistor Rpu serving as a first resistor is connected to the first power supply via the power supply line L1 and the power supply terminal 5. The other end of the resistor Rpu is connected to the output terminal 41. In addition, the output terminal 41 is connected to the terminal 31 serving as a first terminal.

The GND terminal 6 is connected to the GND serving as a second power supply (not shown) and supplies a power supply voltage Vss to a GND line L2. The processor 50 has the other end connected to the GND line L2 and an input port connected to the output terminal 41, i.e., the other end of the resistor Rpu. A connection point between the other end of the processor 50 and the GND line L2 is a node N2 serving as a second connection point. The terminal 34 serving as a fourth terminal is arranged on the load 20A side with respect to the node N2 on the GND line L2.

On the upper surface of the sub-board 3, the inductor 9, the switch SW1, the diode 11, the capacitors 13 and 14, the load 20A, and the terminals 32 and 33 are formed.

The terminal 32 serving as a second terminal is connected to the terminal 31 via the covered wire 37. The covered wire 37 serving as a first conductor contains one end detachably connected to the terminal 31 and the other end detachably connected to the terminal 32. The terminal 32 is connected to one end of the inductor 9. A node N3 is set between the terminal 32 and one end of the inductor 9. The other end of the inductor 9 is connected to an anode serving as one end of the diode 11 serving as a rectifying element. A node N4 is set between the other end of the inductor 9 and the anode of the diode 11. A cathode serving as the other end of the diode 11 is respectively connected to one end of the load 20A and one end of the capacitor 13. A connection point between the cathode of the diode 11 and one end of the load 20A and one end of the capacitor 13 is a node N1 serving as a first connection point. The direction of the diode 11 directed toward the load 20A from the inductor 9 serves as a forward direction.

The other end of the load 20A and the other end of the capacitor 13 serving as a first capacitor are respectively connected to the GND line L2. That is, the capacitor 13 is connected in parallel with the load 20A between the node N1 and the GND line L2. The capacitor 14 serving as a second capacitor is connected between the node N3 and the GND line L2. In addition, the switch SW1 serving as a first switch is arranged between the node N4 and the GND line L2. The terminal 33 serving as a third terminal is arranged between a node N5 and the node N2, the node N5 being a connection point between the switch SW1 and the GND line L2. The terminal 33 and the terminal 34 are connected by the covered wire 38. The covered wire 38 serving as a second conductor one end detachably connected to the terminal 34 and the other end detachably connected to the terminal 33.

Figure 2:
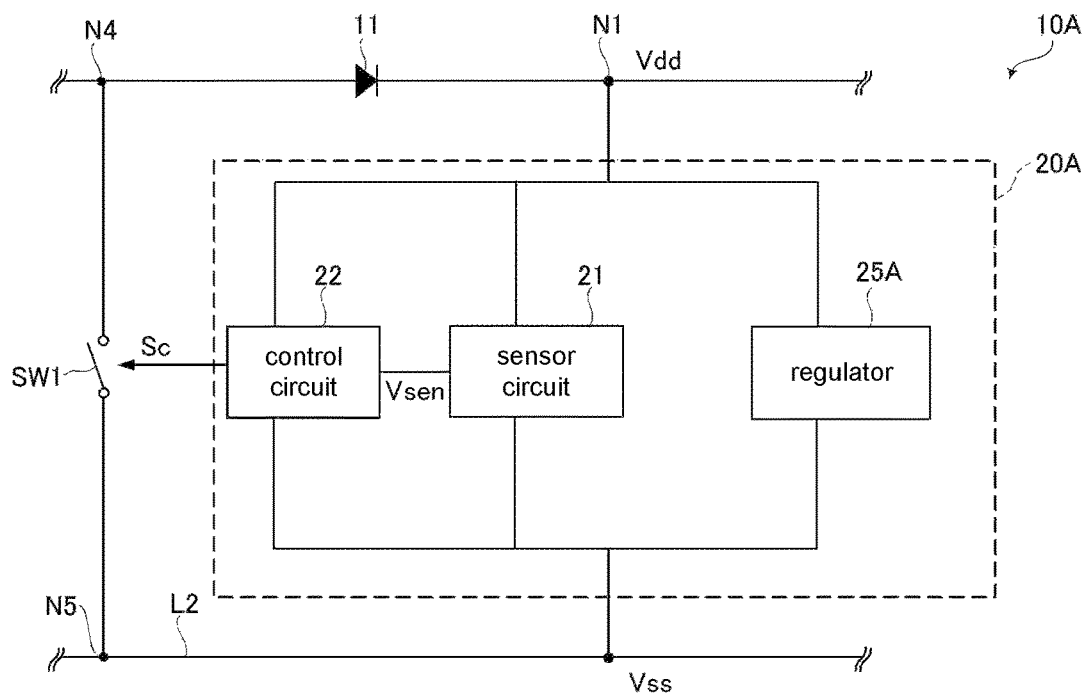
FIG. 2 is a schematic diagram illustrating a configuration example of a load in the transmission circuit of the embodiment.

FIG. 2 is a schematic diagram illustrating a configuration example of the load 20A.

The load 20A has a sensor circuit 21 serving as a signal output circuit, a control circuit 22 serving as a switching controller, and a first regulator 25A. The load 20A is formed as a sensor IC on the sub-board 3. The sensor circuit 21, the control circuit 22, and the first regulator 25A each have one end connected to the node N1 and the other end connected to the GND line L2.

The sensor circuit 21 includes a physical quantity sensor that detects physical quantity. Examples of the physical quantity sensor include various sensors capable of detecting physical quantity, such as a strain gauge, a velocity sensor, an acceleration sensor, a rotary encoder, an image sensor such as CCD or CMOS, an infrared sensor, an ultraviolet sensor, a temperature sensor, a magnetic sensor, a microphone sensor, and the like.

The control circuit 22 is connected to the sensor circuit 21 so as to be capable of transmitting information, and receives signal information supplied from the sensor circuit 21 and indicating the level of a signal voltage Vsen. The control circuit 22 generates a switching control signal Sc for controlling the switching of the switch SW1 between the ON state and the OFF state based on the signal information of the signal voltage Vsen received from the sensor circuit 21. Here, the ON state of the switch SW1 refers to a state in which both ends of the switch SW1 are electrically short-circuited, i.e., a conductive state. The OFF state of the switch SW1 refers to a state in which both ends of the switch SW1 are electrically opened, i.e., a non-conductive state.

The switching control signal Sc is a pulse-like compression wave. A duty ratio D of the compression wave is controlled to $0 \leq D \leq 1$ according to the ON/OFF state of the switch SW1 to be controlled. The control circuit 22 controls the switching in the ON/OFF state of the switch SW1 by outputting the generated switching control signal Sc to the switch SW1.

The first regulator 25A monitors a voltage at a predetermined location in the transmission circuit 10A and adjusts the voltage at the monitored location to be within a fixed range.

Subsequently, the operation of the transmission circuit 10A is described. The transmission circuit 10A includes a so-called boost converter. Here, the time average value of the voltage at the node N3, that is, the voltage of the output terminal 41 (output signal voltage) is set as Vsig, the time average value of the voltage at the node N1 (load power supply voltage) is set as Vdd, the resistance value of the resistor Rpu is set as R1, the time average value of the current flowing through the resistor Rpu is set as Irpu, and the current flowing into the load 20A is set as Iload. In this case, the following formulas (1) and (2) are established from the properties of the boost converter.

$$V\text{sig}=(1-D)\cdot Vdd \qquad (1)$$

$$Irpu=\{1/(1-D)\}\cdot I\text{load} \qquad (2)$$

In addition, considering the voltage drop of the resistor Rpu, Vsig is expressed by the following formula (3) using the power supply voltage Vcc. Furthermore, the following formula (4) is established from the following formulas (3) and (2).

$$V\text{sig}=Vcc-R1\cdot Irpu \qquad (3)$$

$$V\text{sig}=Vcc-R1\cdot\{1/(1-D)\}\cdot I\text{load} \qquad (4)$$

Among the above formulas (1) and (4), four parameters that can be dynamically changed (hereinafter referred to as dynamic parameters) are D, Vsig, Vdd, and Iload. As long as at least one of the above four parameters is controlled based on the detection amount detected by the physical quantity sensor, theoretically, a change in any signal can be transmitted to the processor 50. Accordingly, when an analog signal is to be transmitted to the processor 50, any signal whose level changes can be transmitted to the processor 50 if one of the above four parameters is controlled.

However, due to a relationship in which the number of formulas is two of the above formulas (1) and (4) and the number of dynamic parameters is four, even if one dynamic parameter is controlled, the rest three dynamic parameters are not determined when there is no other condition. For example, if one of the rest three dynamic parameters fluctuates due to some fluctuation factor such as a temperature change, the rest two dynamic parameters also fluctuate. This means that when a signal is to be transmitted to the processor 50, one directly-controlled dynamic parameter is insufficient to transmit the level information. Accordingly, in order for the load 20A to directly control one dynamic parameter and thereby determine the rest three parameters, it is necessary to provide further conditions.

Thus, in the embodiment, pre-setting is made so that another dynamic parameter different from the one directly-controlled dynamic parameter is linked with the one directly-controlled dynamic parameter in a predetermined relationship or becomes a fixed value. By performing the above-described pre-setting, the load 20A can directly control two of the four dynamic parameters.

In addition, in the embodiment, D is selected as one of the two directly-controlled dynamic parameters. There is an advantage that selecting D as one of the dynamic parameters makes it easy to further control the rest two parameters to a desired value except for the other dynamic parameter that is directly controlled by the load 20A. Accordingly, Vsig can be easily extracted at a desired voltage value by using the above formulas (1) and (4) and selecting D as one of the two directly-controlled dynamic parameters.

When D is selected as one of the two directly-controlled dynamic parameters, (i) D and Iload, (ii) D and Vdd, and (iii) D and Vsig are considered as the combinations of the two directly controlled dynamic parameters. Subsequently, each of the combinations of the dynamic parameters of (i)-(iii) and the signal transmission method thereof are described.

(i) Case of Controlling D and Iload

Figure 3:
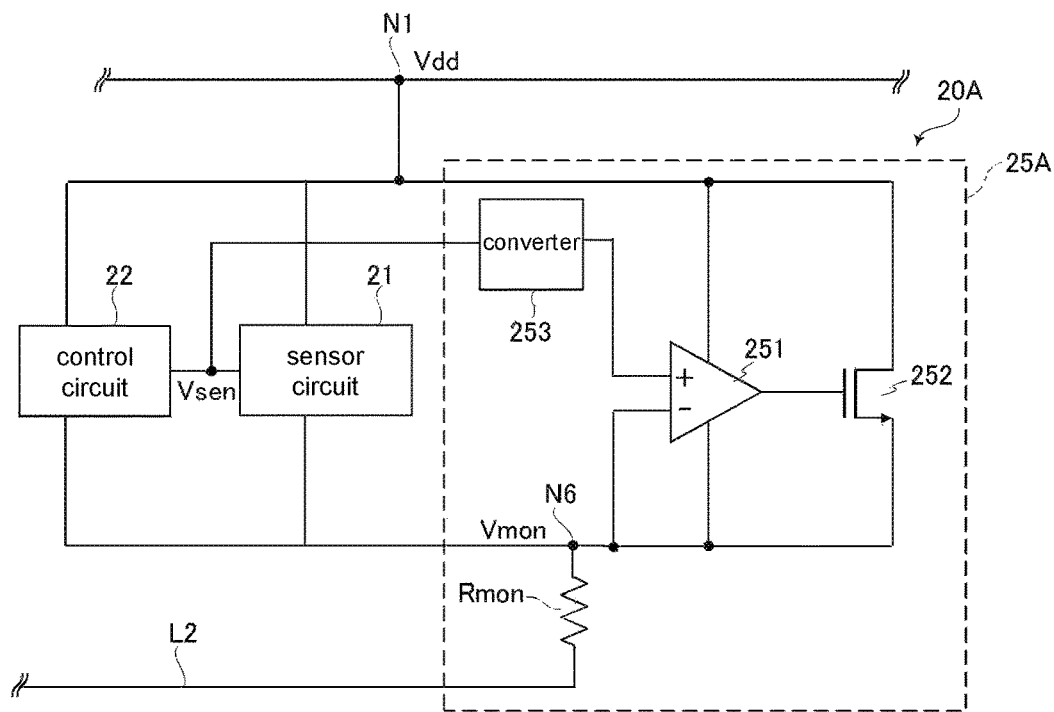
FIG. 3 is a schematic diagram illustrating a configuration example of a first regulator.

The load 20A is configured to be capable of directly controlling D and Iload by using the first regulator 25A in addition to the sensor circuit 21 and the control circuit 22. FIG. 3 is a schematic diagram illustrating a configuration example of the first regulator 25A possessed by the load 20A.

The first regulator 25A includes, for example, an operational amplifier 251, a field effect transistor (hereinafter referred to as FET) 252, a resistor Rmon serving as a second resistor, and a converter 253. The operational amplifier 251 includes a positive power supply terminal connected to the node N1 and a negative power supply terminal connected to a node N6.

The operational amplifier 251 further includes a non-inverting input port serving as a first input port, an inverting input port serving as a second input port, and an output port. A voltage Vref serving as a reference voltage is input to the non-inverting input port. The voltage Vref is supplied from, for example, the converter 253. A voltage Vmon of the node N6 serving as a predetermined location to be monitored is input to the inverting input port.

The FET 252 includes, for example, a gate connected to the output port of the operational amplifier 251, a drain connected to the node N1, and a source connected to the node N6. One end of the resistor Rmon is connected to the node N6 and the source of the FET 252, and the other end is connected to the GND line L2 and grounded.

The converter 253 includes an input port connected to the output port of the sensor circuit 21, an output port connected to the non-inverting input port of the operational amplifier 251, and a conversion operational circuit that converts an input voltage according to a predetermined relationship and supplies the converted voltage.

In the load 20A having the first regulator 25A, first, D and the voltage Vmon proportional to Iload are associated with each other so that Iload is linked with D. Here, because D is determined based on the signal voltage Vsen supplied from the sensor circuit 21, the signal voltage Vsen and the voltage Vmon are associated with each other. By associating the signal voltage Vsen with the voltage Vmon, the converter 253 can convert the signal voltage Vsen and supply a reference of the voltage Vmon, i.e., the voltage Vref serving as the reference voltage.

Subsequently, the control circuit 22 controls D according to the detection amount of the physical quantity sensor of the sensor circuit 21, that is, the signal voltage Vsen. The method for controlling D is appropriately selected and applied from all known methods such as PWM (Pulse Width Modulation), one-bit $\Delta\Sigma$ modulation, and the like. In addition, the first regulator 25A monitors the voltage Vmon of the node N6 based on Vref supplied from the converter 253 and adjusts Iload in accordance with the monitored result. Iload is adjusted by adjusting a drain current of the FET 252. Thus, D and Iload are controlled in a linked manner by the load 20A. Vsig in the rest two dynamic parameters is determined by the above formula (4). In addition, Vdd is determined by the above formula (1) and Vsig determined by the above formula (4).

As described above, the aforementioned signal transmission method includes a step in which the load 20A directly controls D and Iload. In the load 20A, the control circuit 22 and the first regulator 25A can directly control D and Iload among the above four dynamic parameters and thereby indirectly control the rest two dynamic parameters Vsig and Vdd.

(ii) Case of Controlling D and Vdd

The load 20B is configured so that Vdd becomes a fixed value. Specifically, the load 20B has a second regulator 25B, and the second regulator 25B adjusts the voltage so that Vdd becomes a fixed value. In the load 20B, in addition to the sensor circuit 21 and the control circuit 22, the second regulator 25B is used to directly control D and Vdd.

Figure 4:
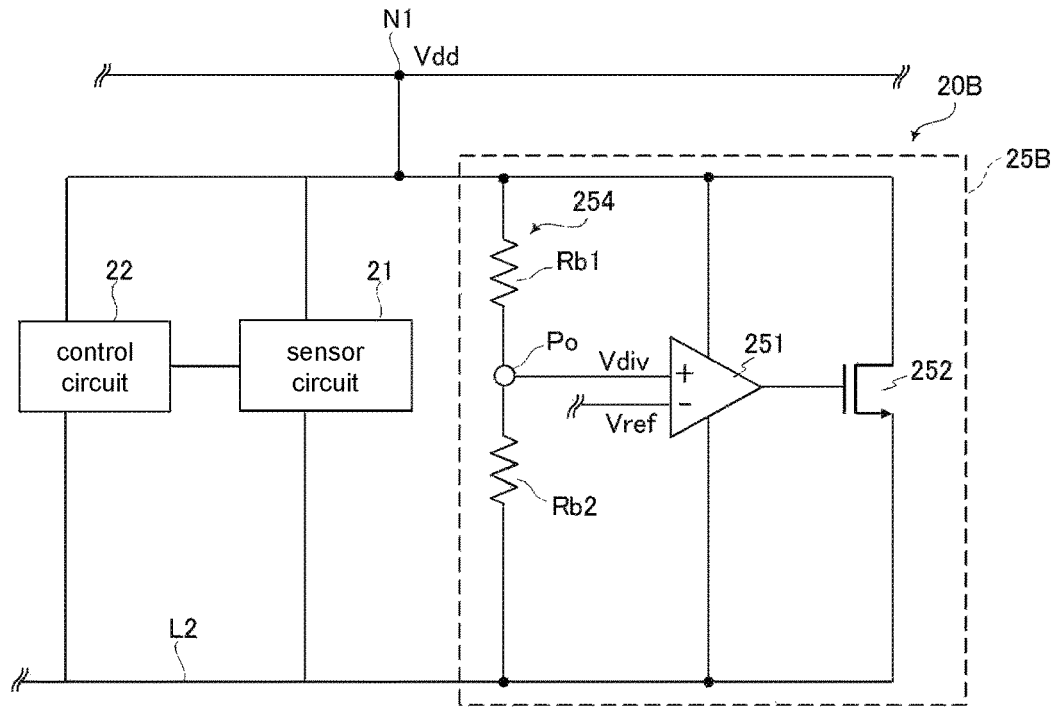
FIG. 4 is a schematic diagram illustrating a configuration example of a second regulator.

FIG. 4 is a schematic diagram illustrating a configuration example of the second regulator 25B possessed by the load 20B.

The second regulator 25B is different from the first regulator 25A in terms of the connection relationship of the operational amplifier 251, not having the resistor Rmon, and having a voltage division circuit 254, but the other points are not substantially different. Thus, components that are not substantially different from the first regulator 25A are denoted by the same reference signs, and redundant description is omitted.

The second regulator 25B has, for example, the operational amplifier 251, the FET 252, and the voltage division circuit 254 including resistors Rb1, Rb2 and an output node Po. The operational amplifier 251 includes an inverting input port serving as a first input port, a non-inverting input port serving as a second input port, and an output port. The voltage Vref serving as a reference voltage is input to the inverting input port. The voltage Vref is supplied from, for example, a voltage reference circuit (not shown). The voltage of the output node Po serving as a predetermined location to be monitored, i.e., a divided voltage Vdiv is input to the non-inverting input port.

The resistors Rb1 and Rb2 are connected in series between the node N1 and the GND line L2. The output node Po is arranged at a connection point between the resistors Rb1 and Rb2. The divided voltage Vdiv obtained by dividing the voltage between the node N1 and the GND line L2 can be extracted from the output node Po.

The load 20B having the second regulator 25B operates so that Vdd becomes a fixed value regardless of D. This means that D and Vdd operate in conjunction in a predetermined relationship.

In the load 20B, the control circuit 22 controls D according to the detection amount of the physical quantity sensor of the sensor circuit 21. In addition, the second regulator 25B monitors the divided voltage Vdiv in the voltage division circuit 254 and adjusts Vdd so that Vdd becomes a fixed value. Thus, D and Vdd are controlled in a linked manner by the load 20B. Vsig in the rest two dynamic parameters is determined by the above formula (1). In addition, Iload is determined by the above formula (4).

As described above, the aforementioned signal transmission method includes a step in which the load 20B directly controls D and Vdd. In the load 20B, the control circuit 22 and the second regulator 25B can directly control D and Vdd among the above four dynamic parameters and thereby indirectly control the rest two dynamic parameters Vsig and Iload.

(iii) Case of Controlling D and Vsig

Figure 5:
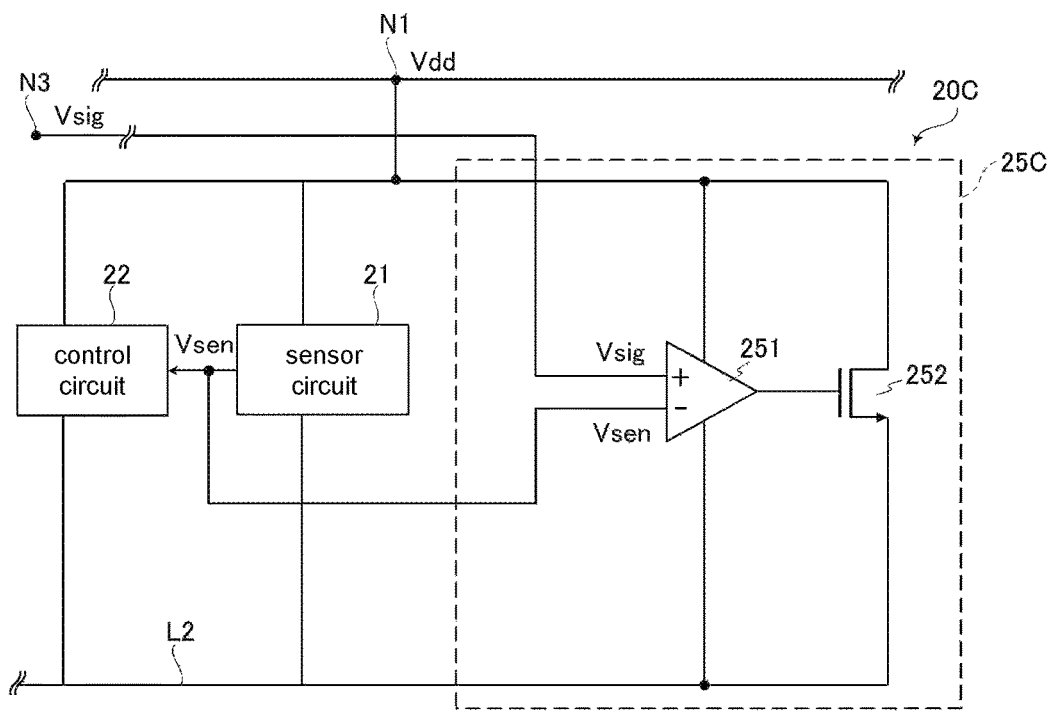
FIG. 5 is a schematic diagram illustrating a configuration example of a third regulator.

The load 20C is configured to be capable of directly controlling D and Vsig by using a third regulator 25C in addition to the sensor circuit 21 and the control circuit 22. FIG. 5 is a schematic diagram illustrating a configuration example of the third regulator 25C possessed by the load 20C.

The third regulator 25C is different from the first regulator 25A in terms of the connection relationship of the operational amplifier 251 and not having the resistor Rmon, but the other points are not substantially different. Thus, components that are not substantially different from the first regulator 25A are denoted by the same reference signs, and redundant description is omitted.

The third regulator 25C has, for example, the operational amplifier 251 and the FET 252. The operational amplifier 251 includes an inverting input port serving as a first input port, a non-inverting input port serving as a second input port, and an output port. The signal voltage Vsen serving as a reference voltage is input to the inverting input port. The voltage of the node N3 serving as a predetermined location to be monitored, i.e., Vsig is input to the non-inverting input port.

In the load 20C having the third regulator 25C, first, pre-setting is made so that Vdd becomes a value which changes within an operation limit range of the load 20C. At this time, it is ideal that a relationship in which D and Vsig are linked with each other is set in advance so that Vdd becomes a fixed value. That is, Vsig is adjusted in advance so that D and Vsig are linked in a known relationship.

Subsequently, the control circuit 22 controls D according to the detection amount of the physical quantity sensor of the sensor circuit 21. In addition, the third regulator 25C monitors Vsig and adjusts Vsig. Vsig is adjusted by adjusting the signal voltage Vsen. Thus, D and Vsig are changed in a linked manner by the load 20C. Vdd in the rest two dynamic parameters is determined by the above formula (1). In addition, Iload is determined by the above formula (4).

As described above, the aforementioned signal transmission method includes a step in which the load 20C directly controls D and Vsig. In the load 20C, the control circuit 22 and the third regulator 25C can directly control D and Vsig among the above four dynamic parameters and thereby indirectly control the rest two dynamic parameters Vdd and Iload.

As described above, according to the embodiment, because the resistor is not connected between the GND and the cathode of the stable power supply, the voltage of the GND connected to the sensor circuit 21 does not fluctuate in magnitude in accordance with the level of the signal supplied from the sensor circuit 21. In addition, according to the above formulas (1) and (4), Vdd given to the loads 20A-20C is determined by D, Vsig, and Iload and thus does not depend on the magnitude of the current flowing through the physical quantity sensor. Therefore, according to the embodiment, even if the signal line is shared with the power supply line L1, the voltage difference between the GND and Vdd applied to the loads 20A-20C can be fixed regardless of the magnitude of the current flowing through the physical quantity sensor. In other words, trade-off is not generated between the current flowing through the physical quantity sensor and the voltage difference between GND and Vdd applied to the loads 20A-20C. Therefore, even when the detection sensitivity of physical quantity of the physical quantity sensor is high, the voltage difference between Vdd and GND can be maintained within the operational voltage range of the physical quantity sensor, and the sensor IC can be operated stably.

In addition, because the voltage of the GND connected to the sensor circuit 21 does not fluctuate in magnitude in accordance with the level of the signal supplied from the sensor circuit 21, the voltage level of the GND can be stabilized. Accordingly, even when the sensor IC including a linear type physical quantity sensor is applied, the sensor IC can be operated stably.

Besides, the present invention is not limited to the above embodiment as it is, and can be implemented in various forms other than the above example in the implementation stage. Various omissions, replacements, and changes can be made without departing from the gist of the invention.

For example, in the transmission circuit of the embodiment, the rectifying element is not necessarily limited to the diode 11, and a switch SW2 that operates in the phase opposite to the switch SW1 may be applied.

Figure 6:
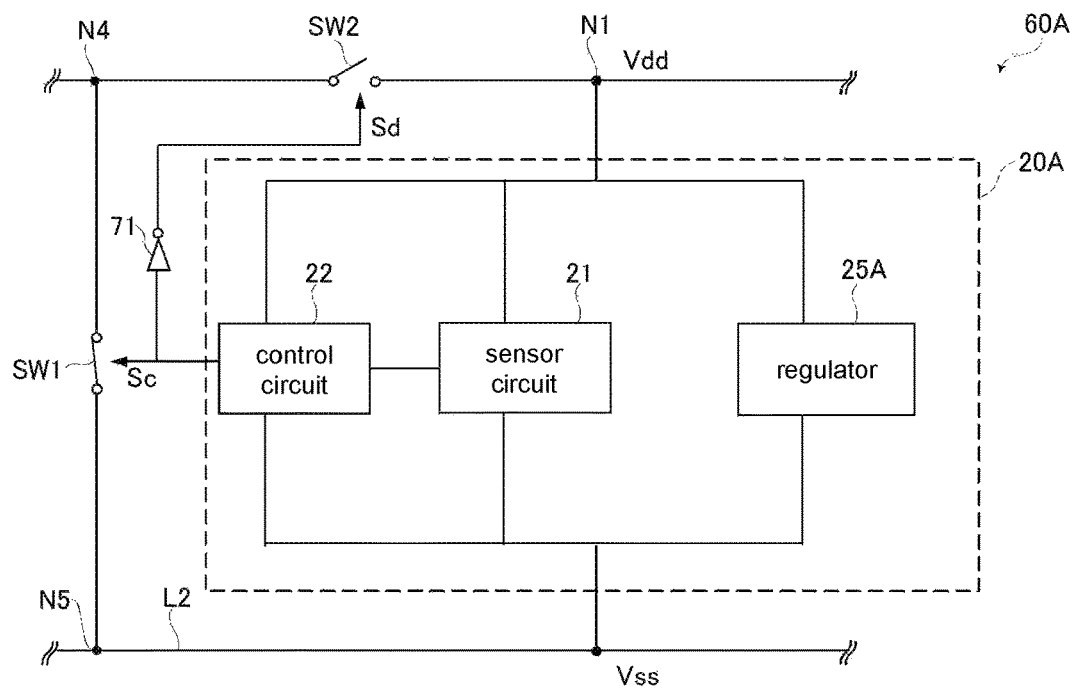
FIG. 6 is a schematic diagram partially illustrating another configuration example of the transmission circuit of the embodiment.

Here, FIG. 6 is a schematic diagram illustrating a partial configuration of a transmission circuit 60A as another configuration example of the transmission circuit of the embodiment.

The transmission circuit 60A illustrated in FIG. 6 generates, via an inverter 71, a switching control signal Sd having a phase opposite to that of the switching control signal Sc and supplies the switching control signal Sd to the switch SW2. The switch SW2 is applied as a rectifying element that transitions to the OFF state when the switch SW1 is on and to the ON state when the switch SW1 is off.

The switch SW2 serving as a rectifying element and a second switch operates in the phase opposite to the switch SW1. That is, the switch SW2 operates in the same manner as the diode 11. More specifically, the switch SW2 switches a path between the node N4 and the node N1 to a non-conductive state when the switch SW1 is on, and switches the path between the node N4 and the node N1 to a conductive state when the switch SW1 is off.

Besides, the switches SW1 and SW2 described above can be appropriately selected and applied from various switching elements capable of switching an electrical circuit between the conductive state and the non-conductive state, or from circuits capable of switching an electrical circuit between the conductive state and the non-conductive state. That is, as long as the switches SW1 and SW2 are elements having a function of switching an electrical circuit between the conductive state and the non-conductive state, the types thereof are not limited. For example, the switches SW1 and SW2 may be mechanical switching elements that mechanically open and close an electrical circuit or electrical switching elements that switch an electrical circuit between the conductive state and the non-conductive state like FET and so on. In addition, the switches SW1 and SW2 may include a logic circuit capable of switching an electrical circuit between the conductive state and the non-conductive state.

The control circuit 22 shown in FIG. 6 is an example in which the switching control signal Sc is generated by transmitting the switching control signal Sc via the inverter 71, but the control circuit 22 is not limited to this example. Instead of the control circuit 22 and the inverter 71, a control circuit configured to respectively generate the two switching control signals Sc and Sd may be included. That is, a control circuit having a function of controlling the ON/OFF state of the switch SW2 in addition to the function of controlling the ON/OFF state of the switch SW1 may be included.

Besides, the loads 20A-20C are examples respectively having the first regulator 25A to the third regulator 25C, but the loads 20A-20C are not required to have the first regulator 25A to the third regulator 25C. As described above, when an analog signal is to be transmitted to the processor 50, any signal whose level changes can be transmitted to the processor 50 as long as one of the above four parameters is controlled. Accordingly, the loads 20A-20C that do not have the first regulator 25A to the third regulator 25C may also be applied to a transmission circuit that transmits an analog signal to the processor 50.

Besides, the transmission circuits 10A and 60A respectively shown in FIGS. 1 and 6 are examples including the capacitors 13 and 14 and the processor 50, but the transmission circuit is not required to include the capacitors 13 and 14. For example, as long as the voltage ripple of the output signal supplied from the output terminal 41 is small and is smooth enough to be tolerated by the processor 50 and the load 20A, the transmission circuits 10A and 60A may be constituted with one or both of the capacitors 13 and 14 omitted. Similarly to the case of the load 20A, one or both of the capacitors 13 and 14 can also be omitted in a case where the loads 20B and 20C are applied.

In addition, the transmission circuits 10A and 60A are not required to include the processor 50 and may be configured to be capable of transmitting signals to the processor 50. That is, the transmission circuits 10A and 60A may include the output terminal 41 capable of transmitting signals to the processor 50.

Furthermore, the transmission circuits 10A and 60A respectively shown in FIGS. 1 and 6 are examples in which the inductor 9 and the capacitor 14 are arranged on the sub-board 3, but the inductor 9 or the inductor 9 and the capacitor 14 may be arranged on the main board 2.

Besides, the transmission circuits 10A and 60A respectively shown in FIGS. 1 and 6 are examples in which the transmission circuits are divided and formed on the main board 2 and the sub-board 3, but the transmission circuits may also be formed on a single board. When the transmission circuits 10A and 60A are formed on a single board, the terminals 31-34 and the covered wires 37 and 38 are omitted.

Besides, in the above embodiment, the sensor circuit 21 serving as a signal output circuit has been described, but the sensor circuit 21 may be a communication circuit capable of exchanging information with an external circuit (not shown). In this case, the communication circuit serving as a signal output circuit supplies, to the processor 50, a signal received from the external circuit or a signal based on the received signal.

The above embodiment or the modification thereof are included in the scope and gist of the invention, and are also included in the invention described in the claims and equivalent ranges thereof.

What is claimed is:

1. A transmission circuit comprising:
    a first resistor with one end connected to a first power supply;
    an output terminal connected to the other end of the first resistor;
    an inductor with one end connected to the output terminal;
    a first switch with one end connected to the other end of the inductor and the other end connected to a second power supply;
    a rectifying element in which one end is connected to the other end of the inductor and one end of the first switch, and which is conductive when the first switch is off and non-conductive when the first switch is on; and
    a load with one end connected to the other end of the rectifying element and the other end connected to the second power supply, wherein
    the load includes a signal output circuit configured to supply signals,
    a switching controller that controls an ON/OFF state of the first switch, and
    the load further includes a regulator that monitors a voltage at a predetermined location and adjusts the voltage at the predetermined location to be within a fixed range.

2. The transmission circuit according to claim 1, wherein the regulator includes: an operational amplifier having a first input port to which a reference voltage is input, a second input port to which the voltage at the predetermined location to be monitored is input, and an output port;
    a field effect transistor having a gate connected to the output port of the operational amplifier, a drain connected to a first connection point at which the other end of the rectifying element and one end of the load are connected, and a source connected to the predetermined location;
    a converter having an input port connected to an output port of the signal output circuit, an output port connected to the first input port of the operational amplifier, and a conversion operational circuit that supplies the reference voltage obtained by converting an input voltage according to a predetermined relationship; and
    a second resistor with one end connected to the predetermined location and the source of the field effect transistor and the other end connected to the second power supply.

3. The transmission circuit according to claim 1, wherein the regulator includes: an operational amplifier having a first input port to which a reference voltage is input, a second input port to which the voltage at the predetermined location to be monitored is input, and an output port;
    a field effect transistor having a gate connected to the output port of the operational amplifier, a drain connected to a first connection point at which the other end of the rectifying element and one end of the load are connected, and a source connected to the second power supply; and
    a voltage division circuit which has an output node connected between the first connection point and the second power supply and capable of extracting a divided voltage obtained by dividing a voltage between the first connection point and the second power supply; and
    the predetermined location is the output node of the voltage division circuit.

4. The transmission circuit according to claim 1, wherein the regulator comprises: an operational amplifier having a first input port to which a reference voltage is input, a second input port to which the voltage at the predetermined location to be monitored is input, and an output port; and
   a field effect transistor having a gate connected to the output port of the operational amplifier, a drain connected to a first connection point at which the other end of the rectifying element and one end of the load are connected, and a source connected to the second power supply; and
the predetermined location is the output terminal.

5. The transmission circuit according to claim 1, wherein the signal output circuit comprises a physical quantity sensor that detects physical quantity.

6. The transmission circuit according to claim 1, wherein the switching controller supplies a compression wave to the first switch.

7. The transmission circuit according to claim 1, wherein the rectifying element is a diode in which the direction directed toward the load from the inductor is set as a forward direction.

8. The transmission circuit according to claim 1, further comprising at least one of a first capacitor connected in parallel with the load, and
   a second capacitor connected between the second power supply and a connection point of the other end of the first resistor and one end of the inductor.

9. A transmission circuit comprising:
   a first resistor with one end connected to a first power supply;
   an output terminal connected to the other end of the first resistor;
   an inductor with one end connected to the output terminal;
   a first switch with one end connected to the other end of the inductor and the other end connected to a second power supply;
   a rectifying element in which one end is connected to the other end of the inductor and one end of the first switch, and which is conductive when the first switch is off and non-conductive when the first switch is on; and
   a load with one end connected to the other end of the rectifying element and the other end connected to the second power supply,
   wherein the rectifying element is a second switch that switches an electrical circuit connecting the other end of the inductor and one end of the load between a conductive state and a non-conductive state;
   the load has a signal output circuit configured to supply signals, and
   a switching controller that controls an ON/OFF state of the first switch;
   the switching controller has a function of controlling an ON/OFF state of the second switch, controls the second switch to be off if the first switch is on, and controls the second switch to be on if the first switch is off.

10. The transmission circuit according to claim 9, wherein the switching controller supplies a compression wave to the first switch and the second switch.

11. A transmission circuit comprising:
   a first resistor with one end connected to a first power supply;
   an output terminal connected to the other end of the first resistor;
   an inductor with one end connected to the output terminal;
   a first switch with one end connected to the other end of the inductor and the other end connected to a second power supply;
   a rectifying element in which one end is connected to the other end of the inductor and one end of the first switch, and which is conductive when the first switch is off and non-conductive when the first switch is on;
   a load with one end connected to the other end of the rectifying element and the other end connected to the second power supply; and
   a processor which has an input port connected to the other end of the first resistor and is connected between the first power supply and the second power supply.

12. The transmission circuit according to claim 11, further comprising: a first terminal arranged between the output terminal and one end of the inductor;
   a second terminal arranged between the first terminal and one end of the inductor;
   a third terminal arranged between the other end of the load and the other end of the first switch, and a second connection point at which the processor and the second power supply are connected;
   a fourth terminal arranged between the third terminal and the second connection point;
   a first conductor containing one end detachably connected to the first terminal and the other end detachably connected to the second terminal; and
   a second conductor containing one end detachably connected to the fourth terminal and the other end detachably connected to the third terminal.

13. The transmission circuit according to claim 12, further comprising: a first substrate on which an electrical circuit connecting the processor, the first resistor, the first terminal, and the fourth terminal is formed; and
   a second substrate on which an electrical circuit connecting the inductor, the rectifying element, the first switch, and the load is formed.

14. The transmission circuit according to claim 11, further comprising: a first terminal arranged between the output terminal and one end of the inductor;
   a second terminal arranged between the first terminal and the inductor;
   a third terminal arranged between the other end of the load and a second connection point at which the processor and the second power supply are connected;
   a fourth terminal arranged between the third terminal and the second connection point;
   a first conductor containing one end detachably connected to the first terminal and the other end detachably connected to the second terminal; and
   a second conductor containing one end detachably connected to the fourth terminal and the other end detachably connected to the third terminal.

15. The transmission circuit according to claim 14, further comprising: a first substrate on which an electrical circuit connecting the processor, the first resistor, the inductor, the first terminal, and the fourth terminal is formed; and
   a second substrate on which an electrical circuit connecting the rectifying element, the first switch, and the load is formed.

* * * * *